Dec. 29, 1959

O. S. WILLIAMS ET AL 2,919,155

WINDSHIELD FOR TRACTOR CAB

Filed May 22, 1956

INVENTORS
OSCAR STANLEY WILLIAMS,
ROBERT S. WILLIAMS.
BY Smithers & Mathis
ATTORNEYS

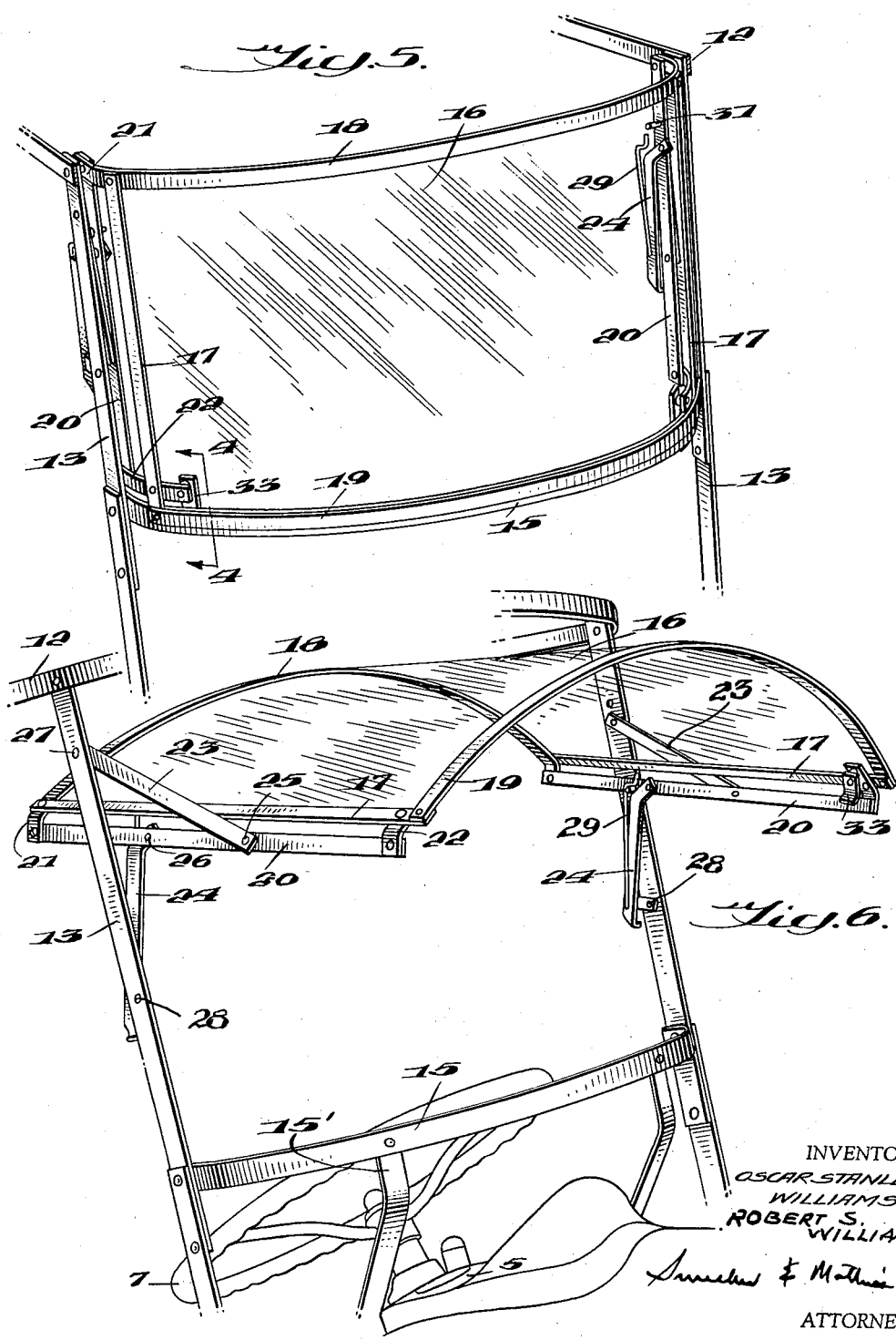

United States Patent Office 2,919,155
Patented Dec. 29, 1959

2,919,155

WINDSHIELD FOR TRACTOR CAB

Oscar Stanley Williams, near Arlington, and Robert S. Williams, Arlington, Ind.

Application May 22, 1956, Serial No. 586,584

7 Claims. (Cl. 296—84)

This invention relates to improvements in windshields for tractor covers.

Tractor covers have been provided heretofore which fit about the operator's compartment of the tractor in position to protect him from wind and rain, as well as to confine some of the heat from the engine of the tractor, to increase the comfort of the operator. An example of such tractor cover is set forth in prior patent, No. 2,707,031, granted April 26, 1955.

Manufacturers of farm tractors have changed the relation of the steering wheel to the engine and fuel tank, as well as the disposition of the instrument panel, which is located at the rear end of the fuel tank, so as to make it difficult to use conventional windshield structures, as heretofore provided, in front of the operator, without interfering either with the operation of the steering wheel or with the disposition of the instrument panel.

One object of this invention is to provide a windshield structure which will not interfere with the operation of the steering wheel or with the full view of the instrument panel and yet will protect the operator at the front, while allowing full, large area vision at the front of the tractor from the enclosed compartment provided by a tractor cover.

A further object of the invention is to improve the construction of windshields for tractor covers by providing secure and effective mounting thereof for opening movements without interference with the steering wheel or with the top over the enclosed compartment.

Another object of the invention is to provide for mounting a windshield on side posts for opening and closing swinging movements and for locking in its respective positions, in a simple and effective manner without requiring merely a pivotal motion, but utilizing a compound motion to obtain the swinging action needed without interfering with other parts of the structure.

These objects may be accomplished, according to one embodiment of the invention, by mounting the windshield on side posts which extend upwardly to the top. The windshield is supported on a compound linkage structure for swinging movement on compound arcs, without being restricted to swinging through an arc on a single axis. This allows the windshield to be bowed not only to clear the steering wheel, but also to avoid interference with the top during the opening and closing movements thereof. Provision is made for secure and effective mounting of the windshield and also for locking it in its open and closed positions.

This embodiment of the invention is illustrated in the accompanying drawings, in which:

Fig. 5 is a perspective view of the windshield structure is in closed positioned; and Fig. 6 is a similar view in open position.

Figure 1:
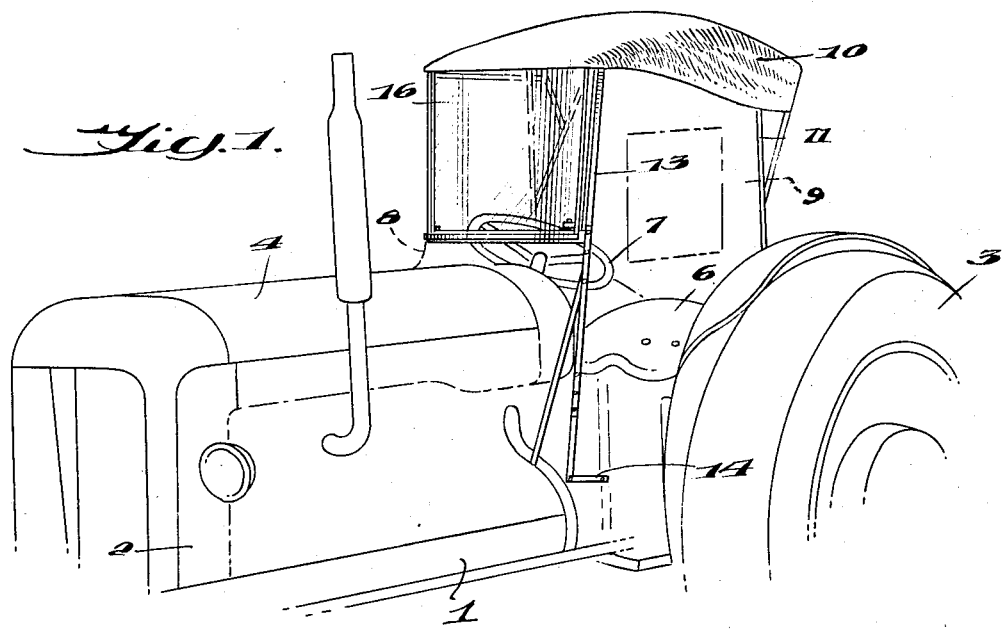
Fig. 1 is a perspective view showing the invention applied to a tractor.

The invention is shown applied to a conventional tractor, such as a farm tractor, in which a frame is indicated generally at 1, the usual engine at 2, traction wheels at 3 and an operator's compartment is located at the rear end of the conventional fuel tank 4 over the engine. An instrument panel is shown generally at 5 (Fig. 6), directly in front of the operator, whose seat is shown at 6. The steering wheel is indicated at 7. This structure, thus described, is conventional and will vary for different makes and sizes of tractors, but is illustrated here as an embodiment of a tractor for purpose of illustrating the invention applied thereto.

The usual tractor cover comprises a cowl portion 8 extending over the top of the fuel tank 4 and about the sides of the engine, as well as about the sides of the operator's compartment, which latter may be closed by doors or side closures 9. A top is shown at 10, supported by upright struts 11, and the top usually has connected therewith a horizontal bow 12 that extends around the inside of the top and supports the covering material thereon. The tractor cover and top are described more in detail in prior patent, No. 2,707,031, granted April 26, 1955.

Suitable framing is provided for the tractor cover including upright posts 13 on opposite sides of the tractor and suitably mounted thereon or on the frame 1 as by means of brackets 14 at the lower ends of the posts. The upper ends of the posts may be connected by bolts or otherwise with the bow 12, or otherwise braced to the tractor for upstanding secure relation.

The posts 13 are supported and braced intermediate their height by a crossbar 15 which extends transversely therebetween. The crossbar 15 is preferably bowed forwardly over the instrument panel 5, as indicated in Fig. 6, to afford to full vision of the latter by the operator, as well as to clear the steering wheel 7. The opposite ends of the crossbar 15 are anchored securely to the posts 13 by bolts, rivets or other fastening means. The crossbar 15 may be braced intermediate its length by one or more brackets 15' anchored at one end to the crossbar and extending downwardly therefrom to the instrument panel 25 or other part of the tractor to which said bracket or brackets may be secured.

The windshield is indicated at 16. This windshield is usually formed of transparent plastic or of other suitable material. This transparent windshield is mounted in a supporting frame including upright side members 17 and horizontal bowed top and bottom frame members 18 and 19, respectively. These parts may be connected securely together to form a rigid frame structure, by bolting, riveting or otherwise securely fastening the same. The frame members 18 and 19 should be bowed, as shown in Fig. 6, to provide the desired bowed relation of the windshield in front of the operator.

Extending parallel with the side frame member 17 and spaced therefrom are mounting arms 20 which extend substantially throughout the height of the windshield. These mounting arms 20 are connected with the upper frame member 18 by extensions 21 on the latter or by brackets connected therewith. The mounting arms 20 are connected with the lower edge of the windshield frame by brackets 22 in the form of straps that extend transversely of the lower ends of the side frame members 17. These parts may also be connected by bolting, riveting and the like.

The side mounting arms 20 are not pivoted directly to the side posts 13. On the other hand, these mounting arms 20 are supported on links 23 and 24, pivotally connected with each arm 20 at 25 and 26, respectively, at points spaced along the length of the arm 20. The link 23 extends upwardly from the point of connection with the arm 20 to a pivot point 27 on the post 13. The link 24 extends downwardly therefrom and is pivotally connected at 28 to the post 13. The link 24 has offset portions at opposite ends thereof.

Thus, as the windshield swings from its closed vertical position in the opening provided by the frame to its open horizontal position through said opening and adjacent the cover top, the upper end of the windshield moves continuously downwardly and rearwardly to clear the cover top, and the lower end of said windshield swings forwardly and upwardly.

Figure 2:
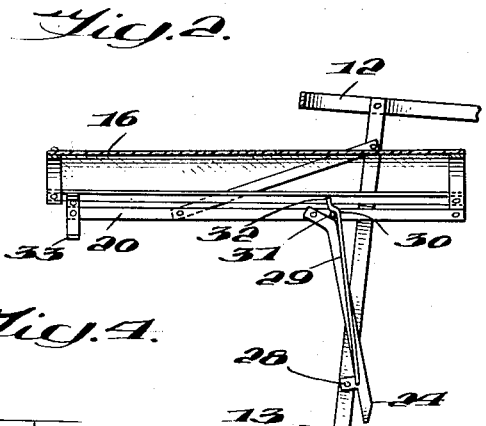
Fig. 2 is a vertical section through the windshield structure, with the windshield in open position.

Each link 24 is provided with a leafspring 29 in the form of a wire welded at one end thereof to the link 24 and having a hook portion 30 at the opposite end thereof in position to engage a pin 31 on the adjacent mounting arm 20. An offset end 32 provides a thumb grip for releasing the spring catch 29 from the pin 31. This spring catch holds the windshield in open position, as shown in Figs. 2 and 6.

Figure 4:
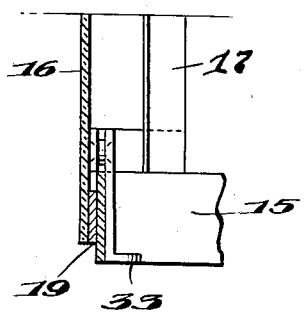
Fig. 4 is a detail vertical section on the line 4—4 in Fig. 5.

The windshield may be locked in its closed position by catches 33 pivotally mounted on the brackets 22 in positions to swing down behind the crossbar 15, as will be apparent from Figs. 4 and 5.

It is well known that different weather conditions require the opening and closing of the tractor cover to different extents. With the cowl portion and enclosure in place, the operator may be kept entirely comfortable and warm, especially in cold or windy weather. However, when it is desired, a part of the enclosure can be removed or opened. It is very often desired to open the windshield 16 to allow air into the operator's compartment or for cooling effect, while the top 10 protects the operator from the sun.

Figure 3:
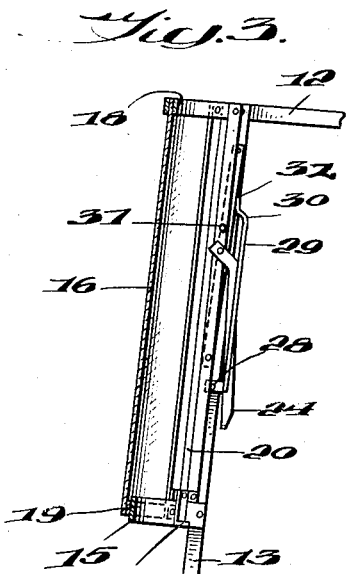
Fig. 3 is a similar view showing the windshield closed.

The windshield normally is closed in the positions shown in Figs. 3 and 5, and is locked in such closed position by the catches 33. When it is desired to close the windshield, the thumb pieces 32 are pressed to disengage the hooks 30 from the pins 31 on the side mounting arms 20, after which the windshield can be moved inward to the positions shown in Figs. 3 and 5. Such movement will occur with respect to the side posts 13 about the pivots 27 and 28. Due to the disposition of these pivots and the connections of the links 23 and 24 with the side posts 13 and with the side mounting arms 20, the windshield will have a compound arcuate movement to its open or closed position which will not interfere with the steering wheel 7 or with the top 10.

Thus, it is possible to provide a large vision windshield that may be moved to open or closed relation with respect to the tractor cover and top, and which will be accommodated to the steering wheel in its overlapping relation with the instrument panel 5 at the rear end of the fuel tank 4.

While the invention has been illustrated and described in one embodiment, it is recognized that variations and changes may be made therein, without departing from the invention, as set forth in the claims.

We claim:

1. A windshield structure for a tractor cover having a cover top, a pair of upright posts adapted to support the front end of said cover top, said posts defining a windshield opening therebetween, a windshield disposed in said opening, link means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links at each side, the links of each pair being pivoted at one end to the post at fixed spaced points and at the other end to the windshield at fixed spaced points.

2. A windshield structure for a tractor cover having a cover top, a pair of upright posts adapted to support the front end of said cover top, said posts defining a windshield opening therebetween, a windshield disposed in said opening, means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links at each side, the links of each pair being pivoted at one end to the post at fixed spaced points and at the other end to the windshield at fixed spaced points, one link of each of said pair of links extending from the forward portion of said windshield when horizontal rearwardly and upwardly of said horizontal windshield to the upper end of said post.

3. A windshield structure for a tractor cover having a cover top, a pair of upright posts adapted to support the front end of said cover top, said posts defining a windshield opening therebetween, a windshield disposed in said opening, means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links, one of said links fixedly pivoted to a forward portion of said windshield when horizontal and extending rearwardly and upwardly and fixedly pivoted to the upper end of one of said posts, the other link fixedly pivoted to said horizontal windshield rearwardly of the windshield pivot of said first-named link and extending downwardly and fixedly pivoted to said post.

4. A windshield structure for a tractor cover comprising a cover top, a pair of upright posts supporting the front end of said cover top, said posts defining a windshield opening therebetween, a bow-shaped windshield disposed in said opening, means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links, one of said links fixedly pivoted to a forward portion of said windshield when horizontal and extending rearwardly and upwardly and fixedly pivoted to the upper end of one of said posts, the other link fixedly pivoted to said horizontal windshield rearwardly of the windshield pivot of said first-named link and extending downwardly and fixedly pivoted to said post.

5. A windshield structure for a tractor cover comprising a cover top, a pair of upright posts supporting the front end of said cover top, said posts defining a windshield opening therebetween, a windshield disposed in said opening, means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links, one of said links fixedly pivoted to a forward portion of said windshield when horizontal and extending rearwardly and upwardly and fixedly pivoted to the upper end of one of said posts, the other link fixedly pivoted to said horizontal windshield rearwardly of the windshield pivot of said first-named link and extending downwardly and fixedly pivoted to said post, and means to automatically lock the windshield in horizontal position.

6. A windshield structure for a tractor cover comprising a cover top, a pair of upright posts supporting the front end of said cover top, said posts defining a windshield opening therebetween, a windshield disposed in said opening, means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links, one of said links fixedly pivoted to a forward portion of said windshield when horizontal and extending rearwardly and upwardly and fixedly pivoted to the upper end of one of said posts, the other link fixedly pivoted to said horizontal windshield rearwardly of the windshield pivot of said first-named link and extending downwardly and fixedly pivoted to said post, and means to automatically lock the windshield in horizontal position, said lock means comprising a leaf spring fixed at one end to said other link adjacent to the pivot thereof on the post, said spring having a hook at its free end engaging a pin on the windshield spaced from the pivot of said other link on said windshield.

7. A windshield structure for a tractor cover comprising a cover top, a pair of upright posts supporting the front end of said cover top, said posts defining a windshield opening therebetween, a bow-shaped windshield disposed in said opening, means mounting the windshield on the posts for continuous downward and rearward shifting movement of the upper end of the windshield to clear said cover top and for forward and upward swinging motion of the lower end of said windshield as the windshield moves from the closed vertical position in said opening to an open horizontal position through said opening and adjacent said cover top, said mounting means including a pair of links, one of said links fixedly pivoted to a forward portion of said windshield when horizontal and extending rearwardly and upwardly and fixely pivoted to the upper end of one of said posts, the other link fixedly pivoted to said horizontal windshield rearwardly of the windshield pivot of said first-named link and extending downwardly and fixedly pivoted to said post, said windshield having a pivot latch on its lower end, and a cross bar interconnecting said posts, said latch engaging said cross bar to lock said windshield in vertical position.

References Cited in the file of this patent

UNITED STATES PATENTS

| | | |
|---|---|---|
| 952,353 | Pitner | Mar. 15, 1910 |
| 1,942,860 | Hummert | Jan. 9, 1934 |
| 2,236,040 | Stryker | Mar. 25, 1941 |
| 2,398,017 | Lidin | Apr. 9, 1946 |
| 2,423,748 | Acheson | July 8, 1947 |
| 2,639,791 | Grist | May 26, 1953 |
| 2,707,031 | Williams | Apr. 26, 1955 |

FOREIGN PATENTS

| | | |
|---|---|---|
| 392,410 | France | Sept. 24, 1908 |
| 399,925 | Great Britain | Oct. 19, 1933 |